(12) United States Patent
Jolliff et al.

(10) Patent No.: US 6,758,290 B2
(45) Date of Patent: Jul. 6, 2004

(54) MODULAR HYDROSTATIC TRANSAXLE FOR ZERO TURN RADIUS MOWER

(75) Inventors: Norman E. Jolliff, Salem, IN (US); Orville R. McDonner, Salem, IN (US); Richard T. Ruebusch, New Albany, IN (US)

(73) Assignee: Tecumseh Products Company, Tecumseh, MI (US)

( * ) Notice: Subject to any disclaimer, the term of this patent is extended or adjusted under 35 U.S.C. 154(b) by 56 days.

(21) Appl. No.: 10/138,759

(22) Filed: May 3, 2002

(65) Prior Publication Data

US 2002/0179340 A1 Dec. 5, 2002

Related U.S. Application Data

(60) Provisional application No. 60/288,979, filed on May 4, 2001.

(51) Int. Cl.[7] ............................................... B62M 11/04
(52) U.S. Cl. ...................... 180/6.48; 180/307; 56/11.9
(58) Field of Search .................... 180/6.48, 6.2, 180/19.1, 19.2, 19.3, 305, 307, 308, 378; 60/484, 485; 56/10.2 R, 10.8, 10.9, 11.9, 14.7, DIG. 11

(56) References Cited

U.S. PATENT DOCUMENTS

| | | | |
|---|---|---|---|
| 3,647,011 A | 3/1972 | Baumgartner | 180/6.48 |
| 4,809,796 A * | 3/1989 | Yamaoka et al. | 180/6.48 |
| 4,920,733 A | 5/1990 | Berrios | 56/10.9 |
| 5,078,222 A | 1/1992 | Hauser et al. | 180/6.48 |
| 5,339,631 A * | 8/1994 | Ohashi | 60/487 |
| 5,816,034 A | 10/1998 | Peter | 56/11.4 |
| 5,921,142 A | 7/1999 | Peter | 74/491 |
| 6,129,164 A | 10/2000 | Teal et al. | 180/6.2 |
| 6,152,247 A | 11/2000 | Sporrer et al. | 180/6.28 |
| 6,196,342 B1 | 3/2001 | Teal et al. | 180/6.2 |
| 6,257,357 B1 | 7/2001 | Teal et al. | 180/6.2 |
| 6,283,235 B1 | 9/2001 | Sporrer et al. | 180/6.28 |
| 6,283,236 B1 | 9/2001 | Teal et al. | 180/6.44 |
| 6,301,885 B1 * | 10/2001 | Johnson et al. | 60/487 |
| 6,484,857 B2 * | 11/2002 | Vonnegut et al. | 192/35 |
| 6,571,555 B2 * | 6/2003 | Abend et al. | 60/487 |

* cited by examiner

Primary Examiner—Lesley D. Morris
Assistant Examiner—Tony Winner
(74) Attorney, Agent, or Firm—Baker & Daniels

(57) ABSTRACT

A hydrostatic transaxle including first and second hydrostatic transmission modules and an axle drive housing. Each module includes a transmission housing, a rotating fluid pump and a rotatable fluid motor with the pump being of variable displacement and the motor being rotated at various speeds and in forward and reverse directions in response to changes in pump displacement. The axle drive housing contains first and second gear trains and a pair of axles. One of the axles is operably coupled to the first transmission module motor through the first gear train, and the other of the axles is operably coupled to the second transmission module motor through the second gear train. Each of the hydrostatic transmission module housings is detachably fixed to the axle drive housing.

21 Claims, 5 Drawing Sheets

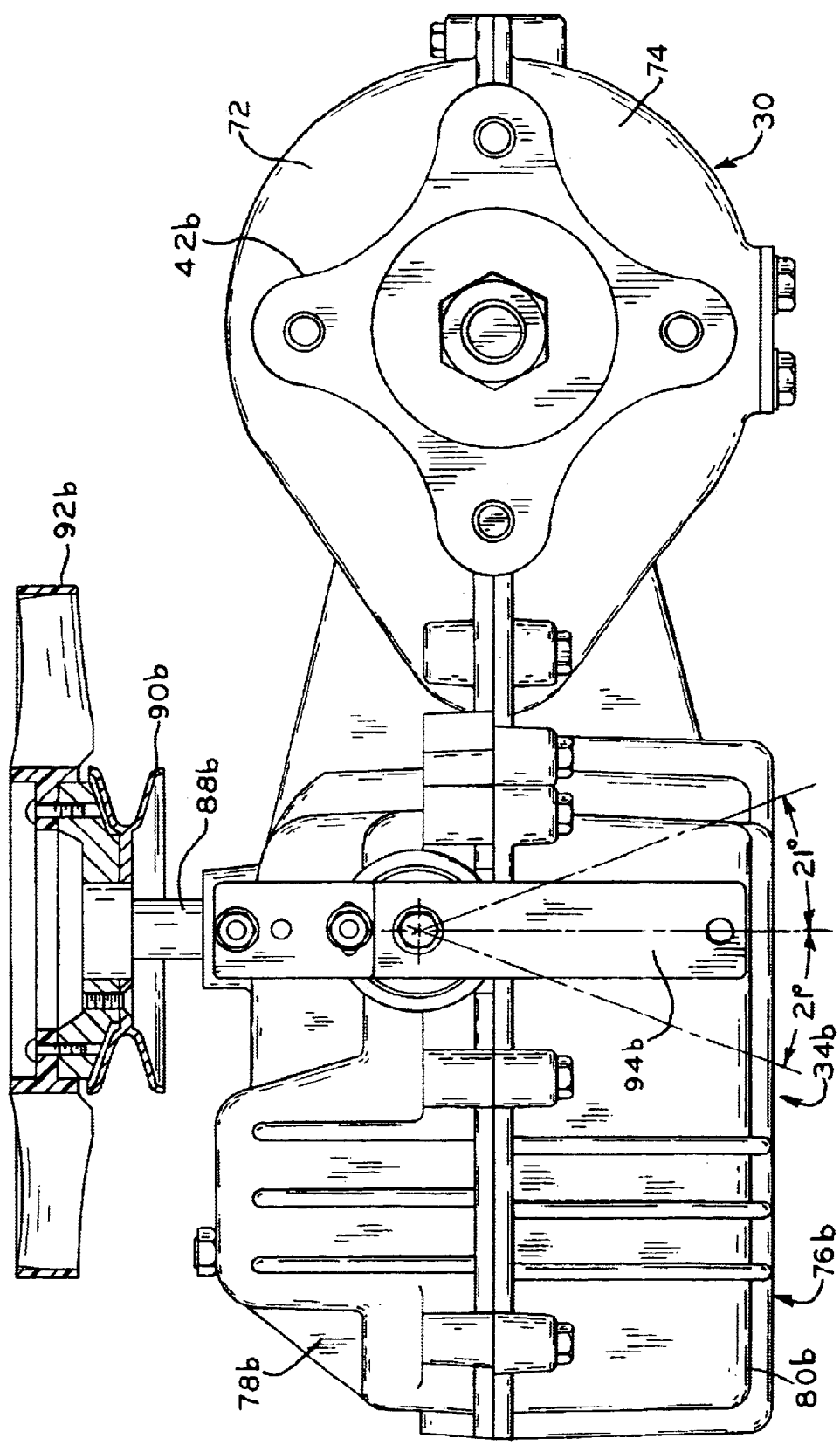
FIG._4

MODULAR HYDROSTATIC TRANSAXLE FOR ZERO TURN RADIUS MOWER

CROSS-REFERENCE TO RELATED APPLICATION

This application claims the benefit under 35 U.S.C. §119 (e) of U.S. Provisional Application No. 60/288,979, filed May 4, 2001.

BACKGROUND OF THE INVENTION

1. Field of Invention

The present invention relates to hydrostatic transmissions intended primarily for use in the lawn and garden industry on vehicles such as riding lawnmowers and wide area, walk-behind lawnmowers, particularly lawnmowers of the zero turn radius variety which are steered by controlling the speed and direction of their ground-engaging drive wheels.

2. Description of the Related Art

Zero turn radius mowers have long been favored by landscape maintenance professionals for their high level of maneuverability; mowers of this type may be turned in place through 360°, allowing faster lawn cutting times. Further, relatively less expensive, noncommercial versions of these mowers have recently become available for residential use. These mowers are provided with a pair of reversible drive wheels, one on each side of the mower, which are independently controlled. Each wheel is driven by a separate fluid motor, and each motor is driven by a separate, positive displacement fluid pump. Normally, there are gear reduction means between the motor and the wheel, by which the speed of the wheel is reduced, and its output torque increased. An engine drives the pumps at a constant speed, and the speed and direction of rotation of each wheel motor is individually controlled by altering the displacement of its associated pump and selecting which of two conduits fluid flows from the pump to the motor. Rotation of the drive wheels in opposite directions at common speeds will spin the mower in place relative to the ground, thereby providing a zero turn radius.

A fluid pump and motor pair may be comprised of separate pump and motor units in fluid communication through hydraulic fluid lines. The axle and gear reduction means may comprise another separate unit attached to the motor unit. A pump and motor pair is required for driving each axle. Additionally, a separate fluid reservoir or sump is also necessary to provide any needed hydraulic fluid to the pump, and space on the mower must be provided for packaging the reservoir or sump.

It is necessary that the engine and pump positions, and the motor and drive axle positions, be fixed relative to each other. Previous zero turn radius mowers rely on the mower frame, which may be made of heavy gauge sheet steel, plate steel and/or angle iron, to provide structural rigidity not only between the engine and the pump units, but also between the two wheel motor units. To provide such rigidity, the frame may require substantial bracing. Further, these frames must be provided with closely toleranced mounting holes for mounting the individual pumps, motors and gear reduction means. Thus previous zero turn radius mowers require a frame which is heavy, rigid, and expensive.

It is known by those of ordinary skill in the art to package a fluid pump and motor pair in a common housing, thereby eliminating external hydraulic lines therebetween and providing a compact module which also includes the reservoir or sump. Examples of such a hydrostatic transmission modules are described in U.S. Pat. No. 6,301,885 and in pending U.S. patent application Ser. No. 09/498,692, filed Feb. 7, 2000, and Ser. No. 09/671,796, filed Sep. 27, 2000, all of which are assigned to Tecumseh Products Company, the disclosures of which are each expressly incorporated herein by reference.

Also known in the art are hydrostatic axle drive units in which a fluid pump and motor pair are packaged with gear reduction means and a portion of an axle shaft in a common housing. One example of such an axle drive is Model 310-1400 IZT (Integrated Zero-Turn) transaxle manufactured by Hydro-Gear of Sullivan, Ill. One IZT transaxle unit is attached to each side of the mower, and drives one of the two drive wheels.

Separate axle drive units such as the IZT transaxle are rather large, and occupy a considerable amount of space on the mower. Further, separate axle drive units such as the IZT transaxle still rely on the mower frame to provide structural rigidity between the two axle drive units. Thus a heavy, rigid and expensive frame is still required to accommodate a pair of individual axle drive units such as IZT transaxles. Additionally, two of these large axle drive units per mower must be shipped, stored and inventoried by the mower assembler.

Moreover, in mowers having a pair of axle drive units such as IZT transaxles, hydrostatic component failure (e.g., failure of the fluid pump or motor) requires removal of an entire axle drive unit, and its associated drive wheel, from the mower, rendering the mower completely immobile, and involves a considerable amount of time to accomplish direct replacement of the failed axle drive unit with another such unit.

What is needed is a compact hydrostatic transmission unit for zero turn radius mowers which has built-in structural rigidity, thereby accommodating a lighter and less expensive frame than would otherwise be necessary, and which, vis-a-vis previous hydrostatic transmissions, facilitates a simpler zero turn radius mower assembly process, reduces shipping and inventory administration costs for such mowers, and provides a means for easily moving a mower having failed hydrostatic components and replacing those components easily and quickly.

SUMMARY OF THE INVENTION

The present invention overcomes the above-mentioned shortcomings of previous hydrostatic transmissions for zero turn radius mowers. The inventive transaxle provides the advantages of requiring only a single, compact transaxle unit per mower, which has built-in rigidity between the paired pumps and motors, which may be easily moved in the event of hydrostatic component failure, and which has hydrostatic components which may be easily and quickly replaced without rendering the mower even temporarily completely immobile.

The present invention provides a hydrostatic transaxle including first and second hydrostatic transmission modules and an axle drive housing. Each module includes a transmission housing, a rotating fluid pump and a rotatable fluid motor with the pump being of variable displacement and the motor being rotated at various speeds and in forward and reverse directions in response to changes in pump displacement. The axle drive housing contains first and second gear trains and a pair of axles. One of the axles is operably coupled to the first transmission module motor through the first gear train, and the other of the axles is operably coupled to the second transmission module motor through the second gear train. Each of the hydrostatic transmission module housings is detachably fixed to the axle drive housing.

By providing built-in structural rigidity between the pumps and motors, the inventive transaxle may be accommodated by a frame which is comparatively lighter, cheaper and less rigid than previously required for a zero turn radius mower. Further, the inventive transaxle provides the advantage of selectively coupling the motors to their associated gear trains, thereby allowing the mower to be easily moved in the event of a hydrostatic component failure. Further still, the inventive transaxle provides the advantage of allowing removal and replacement of the hydrostatic transmission modules without removal of the axle drive housing, either axle or either drive wheel; consequently, the mower is not rendered completely immobile due to a hydrostatic component failure. Moreover, the present invention provides a single compact hydrostatic transaxle through which a zero turn radius mower can be driven; the inventive transaxle is approximately the size of one of the two IZT transaxle units required per mower.

The present invention further provides a zero turn radius vehicle including a frame, a transaxle attached to the frame, and a pair of ground engaging wheels. The transaxle includes first and second hydrostatic transmission modules and an axle drive housing. Each module includes a transmission housing, a rotating fluid pump and a rotatable fluid motor with the pump being of variable displacement and the motor being rotated at various speeds and in forward and reverse directions in response to changes in pump displacement. The axle drive housing contains first and second gear trains and a pair of axles. One of the axles is operably coupled to the first transmission module motor through the first gear train, and the other of the axles is operably coupled to the second transmission module motor through the second gear train. Each of the hydrostatic transmission module housings is detachably fixed to the axle drive housing. One of the ground-engaging wheels is connected to each the axle.

The present invention further provides a hydrostatic transaxle for use in a zero turn radius mower having a rotating blade including a first and a second hydrostatic transmission module and an axle drive. The first and second hydrostatic transmission modules are substantially mirror image versions of each other, and include a transmission housing, a variable displacement rotating fluid pump disposed within the transmission housing, and a rotatable fluid motor disposed within the transmission housing and in fluid communication with the pump, the motor being rotated at various speeds and in forward and reverse directions in response to changes in pump displacement. The first and the second transmission modules are detachably fixed to the axle drive. The axle drive includes an axle drive housing, a first reduction means and a second reduction means disposed in the axle drive housing, and a pair of axles rotatably supported in the axle drive housing. One of the axles is operably coupled to the first transmission module motor through the first reduction means, and the other of the axles is operably coupled to the second transmission module motor through the second reduction means.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 4 is a side view of the hydrostatic transmission of FIG. 1.

Figure 1:
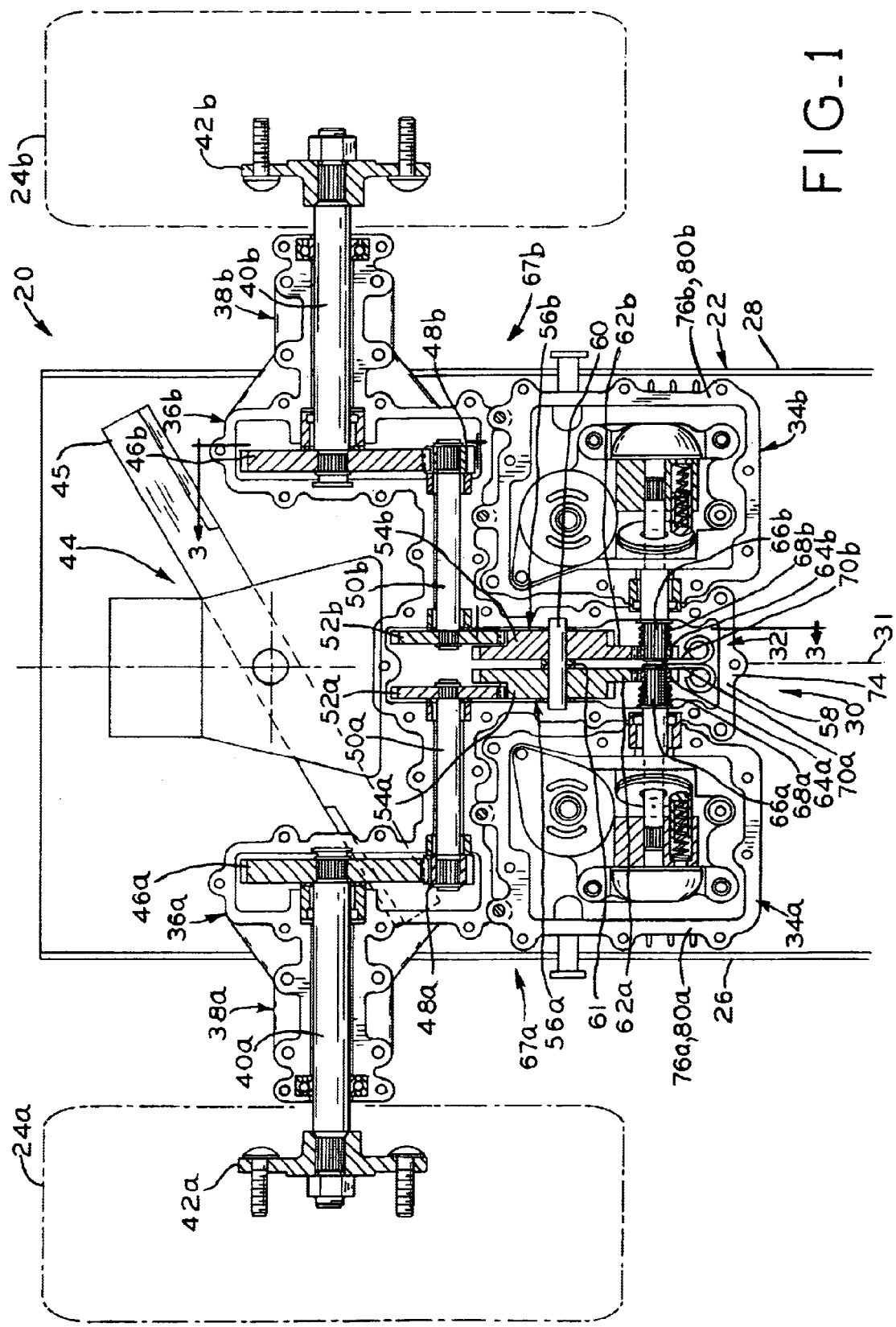
FIG. 1 is a sectional plan view of one embodiment of a hydrostatic transmission according to the present invention shown installed in a vehicle.

Corresponding reference characters indicate corresponding parts throughout the several views. Although the drawings represent one embodiment of the present invention, the drawings are not necessarily to scale and certain features may be exaggerated in order to better illustrate and explain the present invention. The exemplification set out herein illustrates a particular embodiment of the invention such exemplification is not to be construed as limiting the scope of the invention in any manner.

DETAILED DESCRIPTION OF THE INVENTION

FIG. 1 shows a partial view of vehicle 20, which is depicted as a zero turn radius riding or walk-behind mower, having frame 22 and left and right-hand ground-engaging drive wheels 24a and 24b, respectively, shown in ghosted lines. Frame 22 includes left-hand frame rail 26 and right hand frame rail 28. Between left and right hand frame rails 26 and 28 is disposed inventive transaxle assembly 30. Transaxle 30, which is symmetrical about longitudinal axis 31, includes Y-shaped axle drive housing 32 and mirror-image hydrostatic transmission modules 34a and 34b mounted on opposite sides of the axle housing's longitudinal center portion. The structure and operation of hydrostatic transmission modules 34a and 34b are described in the above-incorporated U.S. Patent and U.S. Patent Applications assigned to Tecumseh Products Company.

Arm portions 36a and 36b of Y-shaped axle drive housing 32, which extend from the housing's longitudinal center portion, respectively include laterally extending portions 38a and 38b. Axles 40a and 40b laterally extend colinearly through housing portions 38a and 38b, respectively, and are provided with splines upon which are fitted hubs 42a and 42b. Ground engaging drive wheels 24a and 24b are respectively attached to hubs 42a and 42b, and are independently driven in forward and reverse directions, at variable speeds.

A centrally-located space is provided between Y-shaped housing arm portions 36a and 36b in which electromagnetic clutch 44 may be packaged. Electromagnetic clutch 44, which may be of any suitable type known in the art, selectively transfers power from the engine (not shown) of mower 20 to rotary cutting blades 45 and is commonly-provided on previous zero turn radius mowers. The provision of a Y-shaped axle drive housing permits transaxle 30 to be centrally packaged between the mower drive wheels without necessitating separate left and right-hand wheel motors or axle drive units, as commonly used in previous zero turn radius mowers.

Within housing 30 are large diameter gears 46a and 46b which are rotatably attached to the ends of axles 40a and 40b opposite that to which wheels 24 are attached. Gears 46a and 46b are respectively intermeshed with small diameter gears 48a and 48b. Each gear 48 is attached to an end of a jackshaft 50. Colinear jackshafts 50a and 50b extend in directions parallel to the axes of rotation of axles 40, and between the longitudinally-extending portions of housing arms 36a and 36b, and longitudinally-extending axle drive housing center portion 58.

Figure 3:
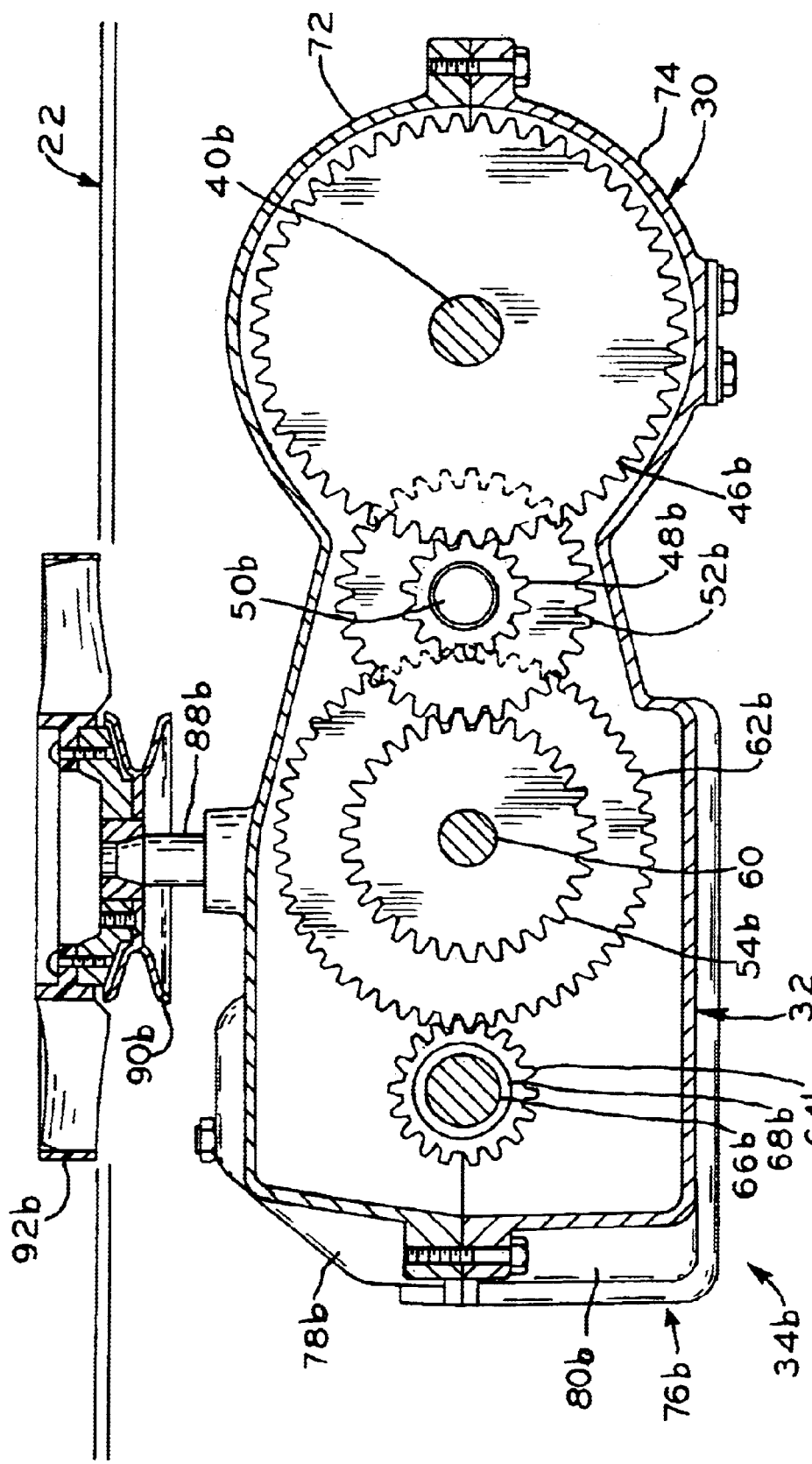
FIG. 3 is a sectional side view of the hydrostatic transmission of FIG. 1 taken along line 3—3 of FIG. 1.

Rotatably attached to the superposed ends of jackshafts 50a and 50b are large diameter gears 52a and 52b, respectively. As also shown in FIG. 3, each gear 52 is intermeshed with small diameter portions 54a, 54b of compound gears 56a or 56b. Compound gears 56 are disposed within longitudinally-extending axle drive housing center portion 58, and are both rotatably mounted upon a single short shaft 60. Thrust bearing members 61 are provided between compound gears 56a and 56b to maintain their respective axial positions and allow them to rotate freely relative to one another. Compound gears 56a and 56b are provided with large diameter portions 62a, 62b, respectively, which cooperate with small diameter gears 64a, 64b, respectively. Small diameter gears 64a and 64b are respectively mounted on splines provided on the output shafts of hydrostatic transmission modules 34a and 34b. Thus it can be seen that hydrostatic transmission modules 34a and 34b are individually operably coupled with axles 40a and 40b, respectively, through separate first and second (or left hand and right hand) gear trains. Each gear train 67a and 67b, both of which are contained within axle drive housing 32, comprises gears 46 and 48, jackshaft 50, and gears 52, 56 and 64.

Gears 64 are rotatably fixed to the hydrostatic transmission module output shafts, but may move axially therealong. Compression springs 68a and 68b provided within axle drive housing center portion 58 each urge its abutting gear 64 into an engaged position in which they that gear 64 is in meshed engagement with the associated large diameter gear portion 62. Each gear 64a, 64b may be urged along respective shaft splines 66a, 66b against the force of its spring 68 into a disengaged position in which it is out of meshed engagement with large diameter gear portion 62. Disengagement mechanisms comprising arms 70a and 70b are provided for selectively moving gears 64 out of engagement with their respective large diameter portions 62 of compound gears 56. It will now be apparent to those of ordinary skill in the art that, in order to facilitate manual maneuvering of mower 20, or in the event of a hydrostatic component failure, one or both of modules 34a or 34b, that module may be individually operatively disconnected from the speed reducing gear train which couples the hydrostatic motor with its respective axle. By so disconnecting the hydrostatic transmission modules from the gear trains, mower 20 may be easily moved about without operating the engine, and may remain mobile and maneuverable despite the failure of a hydrostatic transmission component.

Referring now to FIG. 4, it can be seen that axle drive housing 32 includes upper housing portion 72 and lower housing portion 74 which are joined along a horizontal parting line which lies in a plane extending through the axes of rotation of axles 40 and jackshafts 50. As also exemplified in FIG. 4, hydrostatic transmission modules 34a, 34b each include a housing 76a, 76b having upper housing portion 78a, 78b and lower housing portion 80a, 80b. As noted above, transmission modules 34a and 34b are mirror image versions of each other; so it is that upper housing portions 78a, 78b and lower housing portions 80a, 80b are respectively identical, mirror image components.

Disposed within each of hydrostatic transmission modules 34a and 34b is center section or block 82 which contains a pair of fluid conduits which extend between that module's pump and motor. Center sections or blocks 82a and 82b are identical, but mirror images of each other; the structure of a block 82 is detailed in above-incorporated U.S. Pat. No. 6,301,885. Each of hydrostatic transmission modules 34 includes an axial piston pump (not shown), such as those known in the art, and axial piston motor 86, both mounted to its block 82. In each module 34, the axes of rotation of the pump and motor extend perpendicularly, and the rotating barrel of motor extends axially over the block 82, thereby making module 34 compact. With reference to FIG. 1, the placement of modules 34a and 34b behind the arm portions of axle drive housing 32, on opposite sides of longitudinally-extending axle drive housing center portion 58, provides transmission 30 with a footprint which, with the exception of the above-described space for electromagnetic clutch 44 and laterally-extending axle drive housing portions 38, is substantially square and of a width which facilitates its placement between closely spaced frame rails 26, 28. Further, because of the electromagnetic clutch-accommodating space provided between housing arm portions 36a and 36b, transaxle 30 requires only minimal packaging space longitudinally behind clutch 44.

Referring to FIGS. 3 and 4, each pump of modules 34a and 34b is provided with vertically-extending input shaft 88a, 88b, respectively to which is affixed drive pulley 90a, 90b and fan 92a, 92b, respectively. Pulleys 90a and 90b are belt-driven by the mower engine (not shown) and are rotated in the same direction to impart constant-speed rotating motion to the pumps. Each of the pumps is of variable displacement, and the displacement, and direction of fluid flow through the conduits of block 82, between the pump and its respective motor 86, is controlled by a swashplate assembly (not shown). The operation of the axial piston pump and motor combination is generally well known in the art and described in the above-incorporated references. The swashplate assembly is adjusted via pivoting movement of levers 94a, 94b (see, e.g., FIG. 4) respectively provided on each of hydrostatic transmission modules 34a and 34b. Levers 94a, 94b with are manipulated through well-known linkage means (not shown) by the mower operator, may be provided with a neutral adjustment mechanism and return spring as described in above-incorporated U.S. patent application Ser. No. 09/671,796. As shown in FIG. 4, each of levers 94 pivots its swashplate assembly approximately 21E from its neutral position in the forward and reverse directions for controlling the pump displacement and direction of fluid flow to the motor. As is well known in the art, in the pump neutral position, substantially zero fluid flow is provided to the motor, and the motor is then not driven in either direction. Fluid flow from the pump to the motor through one conduit within block 82 will drive the motor in a forward rotating direction; and fluid flow from the pump to the motor through another conduit within the block will drive the motor in a reverse rotating direction.

Figure 2A:
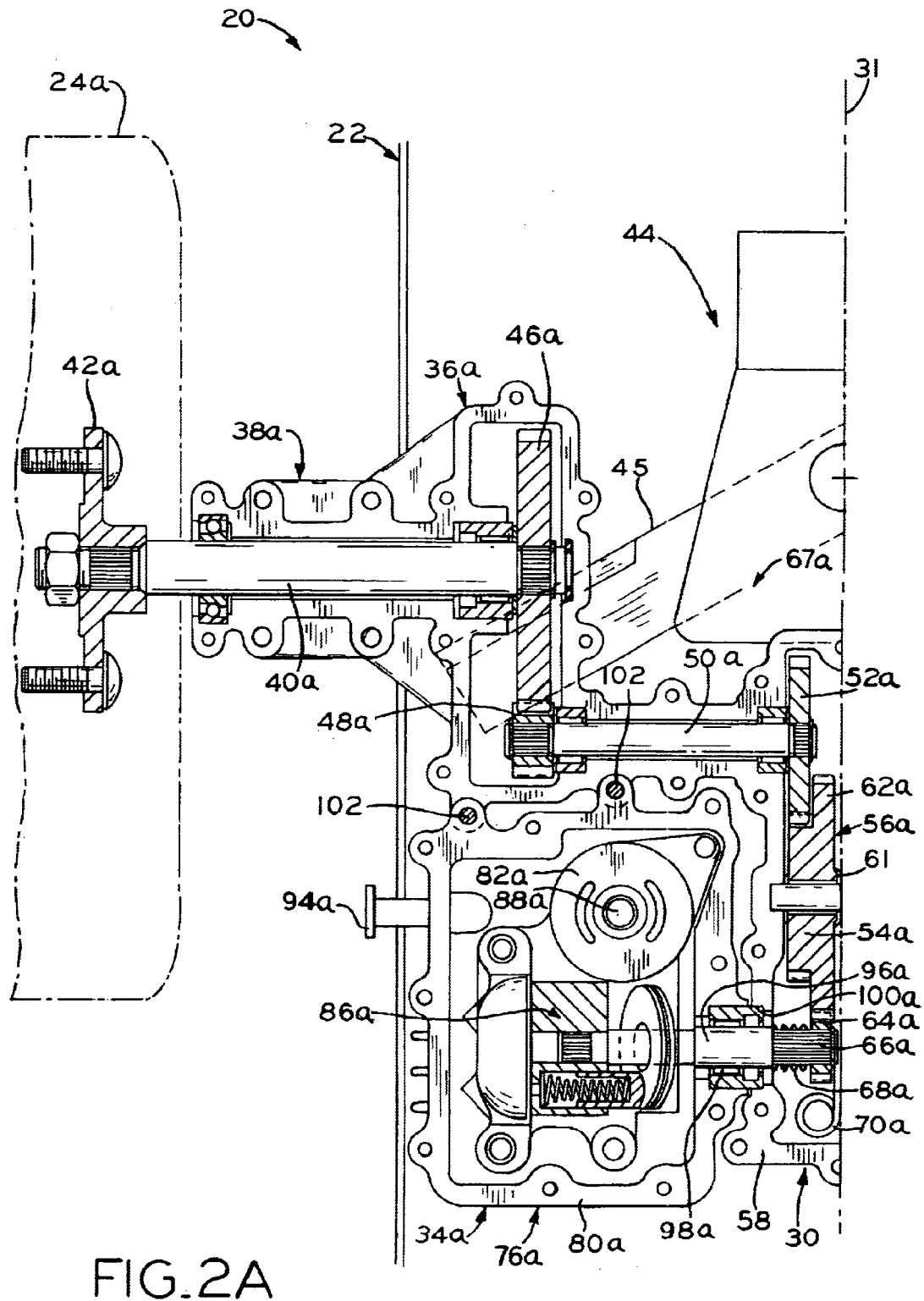
FIG. 2A is an enlarged sectional plan view of the left hand portion of FIG. 1.
Figure 2B:
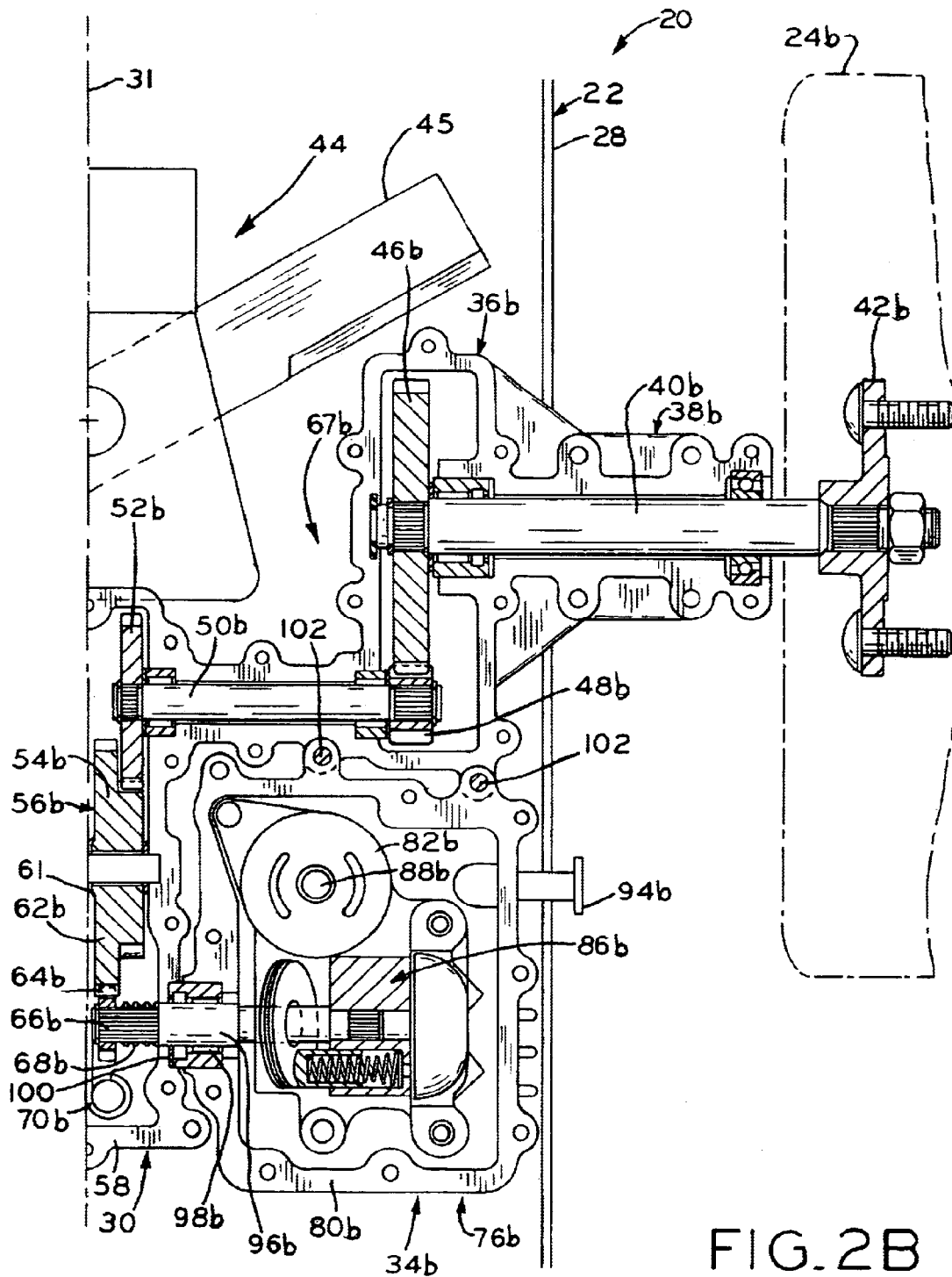
FIG. 2B is an enlarged sectional plan view of the right hand portion of FIG. 1.

Each of rotatable motors 86a and 86b is rotatably fixed to a respective transmission module output shaft 96a, 96b which is radially supported within a respective bearing 98a, 98b. A portion of bearings 98a, 98b extends axially from transmission module housings 76a, 76b, and is received in a respective recess 100a, 100b provided in axle drive housing center portion 58. The end of each transmission output shaft 96 is provided with splines 66 as described above. As noted above, and with reference to FIGS. 2A and 2B, hydrostatic transmission modules 34a and 34b are mounted to axle drive housing 32 at opposite lateral sides of axle housing center portion 58. Modules 34 are attached to housing 32 at points 102 by means of bolts (not shown) and through the engagement of bearing 98 and recess 100 as described above. Those of ordinary skill in the art will now appreciate that hydrostatic transmission modules 34a and 34b may be individually and separately removed and replaced without removal of transaxle 30, or even a wheel 24, from mower 20.

Transaxle 30 may be attached to frame 22 in any convenient manner, for example, mounting members (not shown) may be attached to left and right hand frame rails 26 and 28 to provide mounts to which laterally extending housing portions 38 are attached. Further, center axle drive housing portion 58 may be attached to frame 22 in any convenient manner.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A hydrostatic transaxle comprising:
   first and second hydrostatic transmission modules, each said module comprising a transmission housing, a rotating fluid pump and a rotatable fluid motor, said pump being of variable displacement, said motor being rotated at various speeds and in forward and reverse directions in response to changes in pump displacement; and
   an axle drive housing containing first and second gear trains, and a pair of axles, one of said axles being operably coupled to said first transmission module motor through said first gear train, the other of said axles being operably coupled to said second transmission module motor through said second gear train;
   wherein each of said hydrostatic transmission module housings is detachably fixed to said axle drive housing.

2. The hydrostatic transaxle of claim 1, wherein said axle drive housing is substantially Y-shaped and has a longitudinal center portion and a pair of arm portions extending from said center portion, a said axle extending from each said axle drive housing arm portion, and one of said hydrostatic transmission modules is located on opposite sides of said axle drive housing longitudinal center portion.

3. The hydrostatic transaxle of claim 2, wherein said axle drive housing defines a space between said arm portions.

4. The hydrostatic transaxle of claim 3, wherein said space includes an electromagnetic clutch disposed therein for rotating a blade.

5. The hydrostatic transaxle of claim 1, wherein said first hydrostatic transmission module motor and said first gear train are selectively coupled together and said second hydrostatic transmission module motor and said second gear train are selectively coupled together.

6. The hydrostatic transaxle of claim 1, wherein said first and said second transmission modules are substantially mirror image versions of each other.

7. The hydrostatic transaxle of claim 1, wherein said first and said second transmission modules are independently controlled.

8. The hydrostatic transaxle of claim 1, wherein said first and said second gear trains are independently operable relative to each other.

9. A zero turn radius vehicle comprising:
   a frame;
   a transaxle attached to said frame and comprising:
      first and second hydrostatic transmission modules, each said module comprising a transmission housing, a rotating fluid pump and a rotatable fluid motor, said pump being of variable displacement, said motor being rotated at various speeds and in forward and reverse directions in response to changes in pump displacement; and
      an axle drive housing containing first and second gear trains, and a pair of axles, one of said axles being operably coupled to said first transmission module motor through said first gear train, the other of said axles being operably coupled to said second transmission module motor through said second gear train;
      wherein each of said hydrostatic transmission module housings is detachably fixed to said axle drive housing; and
   a pair of ground engaging wheels, one said ground-engaging wheel connected to each said axle.

10. The vehicle of claim 9, wherein said first hydrostatic transmission module motor and said first reduction gear train are selectively coupled together and said second hydrostatic transmission module motor and said second reduction gear train are selectively coupled together.

11. The vehicle of claim 9, wherein said axle drive housing is substantially Y-shaped and has a longitudinal center portion and a pair of arm portions extending from said center portion, a said axle extending from each said axle drive housing arm portion, and one of said hydrostatic transmission modules is located on opposite sides of said axle drive housing longitudinal center portion.

12. The vehicle of claim 11, wherein said axle drive housing defines a space between said arm portions.

13. The vehicle of claim 12, further comprising an electromagnetic clutch disposed in said space and a rotating blade mounted to said frame, said electromagnetic clutch rotating said blade.

14. The vehicle of claim 9, wherein said first hydrostatic transmission module motor and said first gear train are selectively coupled together and said second hydrostatic transmission module motor and said second gear train are selectively coupled together.

15. The vehicle of claim 14, wherein, when at least one of said first and said second hydrostatic transmission modules is uncoupled from its respective one of said first and said second reduction gear trains, said vehicle remains mobile on said ground-engaging wheels.

16. The vehicle of claim 9, wherein said first and said second transmission modules are substantially mirror image versions of each other.

17. The vehicle of claim 9, wherein said first and said second gear trains are independently operable relative to each other.

18. A hydrostatic transaxle for use in a zero turn radius mower having a rotating blade, said transaxle comprising:
   a first hydrostatic transmission module and a second hydrostatic transmission module, said first and said second hydrostatic transmission modules being substantially mirror image versions of each other, said first and said second modules each comprising:
      a transmission housing;
      a variable displacement rotating fluid pump, said pump disposed within said transmission housing; and
      a rotatable fluid motor disposed within said transmission housing and in fluid communication with said pump, said motor being rotated at various speeds and in forward and reverse directions in response to changes in pump displacement; and an axle drive, said first and said second transmission modules being detachably fixed to said axle drive, said axle drive comprising:

an axle drive housing;

a first reduction means and a second reduction means disposed in said axle drive housing; and a pair of axles rotatably supported in said axle drive housing, one of said axles being operably coupled to said first transmission module motor through said first reduction means, the other of said axles being operably coupled to said second transmission module motor through said second reduction means.

19. The hydrostatic transaxle of claim 18, wherein said axle drive housing is substantially Y-shaped and has a longitudinal center portion and a pair of arm portions extending from said center portion, a said axle extending from each said axle drive housing arm portion, said axle drive housing defining a space between said arm portions.

20. The hydrostatic transaxle of claim 19, wherein said space accommodates an electromagnetic clutch located therein which is selectively coupled to a mower blade.

21. The hydrostatic transaxle of claim 18, wherein said first hydrostatic transmission module motor and said first reduction means are selectively coupled together and said second hydrostatic transmission module motor and said second reduction means are selectively coupled together.

* * * * *